(No Model.)
A. CADWELL.
THILL COUPLING.
No. 245,131. Patented Aug. 2, 1881.
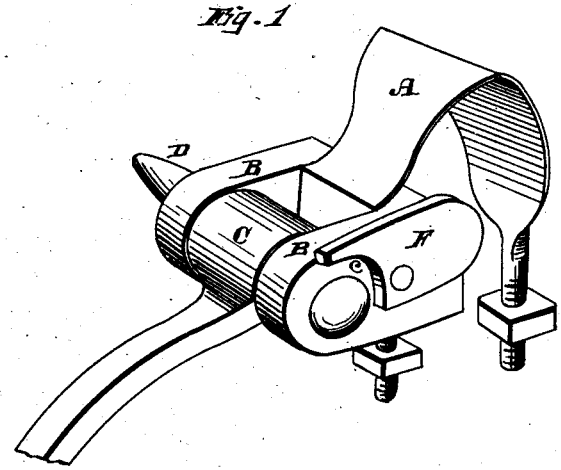
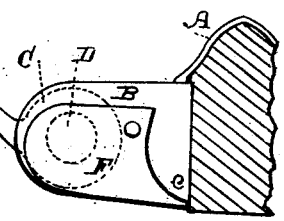
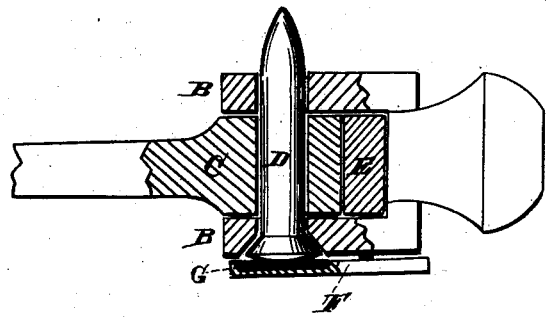
Witnesses
Geo. H. Strong
Frank B. Brooks
Inventor
Alexander Cadwell
By Dewey & Co.
Attys

UNITED STATES PATENT OFFICE.

ALEXANDER CADWELL, OF PETALUMA, CALIFORNIA.

THILL-COUPLING.

SPECIFICATION forming part of Letters Patent No. 245,131, dated August 2, 1881.

Application filed April 14, 1881. (No model.)

*To all whom it may concern:*

Be it known that I, ALEXANDER CADWELL, of Petaluma, county of Sonoma, State of California, have invented an Improved Thill-Coupling; and I hereby declare the following to be a full, clear, and exact description thereof.

My invention relates to certain improvements in thill-couplings; and it consists in certain details of construction, as hereinafter described and claimed.

The object of my invention is to secure the bolt tightly, whereby all rattling is prevented and the danger of loss and accident averted.

Referring to the accompanying drawings, Figure 1 is a perspective view. Fig. 2 is a section. Fig. 3 is a side view of the thill.

Let A represent the clip which encircles the fore axle. It is provided with the flanges B, having holes, through which the coupling-bolt D passes. This bolt has no screw-threads on its end. Instead of such threads, it is tapered down at its end, as shown. This is for the purpose of allowing it to be readily inserted through the flanges B and the thill C. This is accomplished easily, for this reason: The rubber buffer E between the flanges causes considerable pressure to be brought to bear upon the thill to force it in line with the holes in the side flanges, and when the bolt has a blunt end it can render no assistance and cannot enter until all the holes are in line. By tapering its ends as I have shown, it can be made to act as a sort of wedge upon entering. By taking a slight hold of the thill and pressing it back in line with holes in the flanges, it can thus be inserted more readily.

The bolt D has a head slightly rounded on top and countersunk into the side of the flange B to make its edges lie flush therewith. On the outside of the flange in which the head of the bolt fits, is a thumb-plate, F, having a projecting point or shoulder, c, on its lower rear end. This plate is pivoted to the flange, as shown. On its inner side is a socket, in which a rubber washer, G, fits, so that when the plate is moved forward around its pivoted point the rubber washer will cover and press upon the head of the bolt. This plate will thus hold the bolt in place, and the rubber will prevent any slip and keep the device from jarring and rattling. The shoulder c, when the plate F is in position to hold the bolt in, presses against the axle, so that the plate cannot move down by the bolt-head. The front of the plate being the heaviest part, the weight would naturally cause it to slip down and uncover the bolt; but by having this projecting point or shoulder c the plate cannot fall down in front because of the axle being in the way of the said point or shoulder.

When the bolt is to be withdrawn the plate can be swung back. No nut is thus needed to hold the bolt in. It makes a neat and convenient coupling, tight and secure, with no rattle or liability to injury.

I am aware that heretofore thill-couplings have been made wherein a pivoted thumb-piece covers the head of and secures in place a tapering bolt; hence I make no broad claim to either such a thumb-piece or such a bolt, but limit myself to the construction described.

Having thus described my invention, what I claim as new, and desire to secure by Letters Patent, is—

In a thill-coupling having a clip, A, with projecting flanges B, thill C, and securing-bolt D, the thumb-plate F, pivoted to the outside of the flange B, in which the bolt-head fits, and provided with a shoulder or projection, c, and a socket on its inner side fitted with an elastic washer or buffer, G, substantially as and for the purpose herein described.

In witness whereof I have hereunto set my hand.

A. CADWELL.

Witnesses:
WM. F. BOOTH,
S. H. NOURSE.